UNITED STATES PATENT OFFICE.

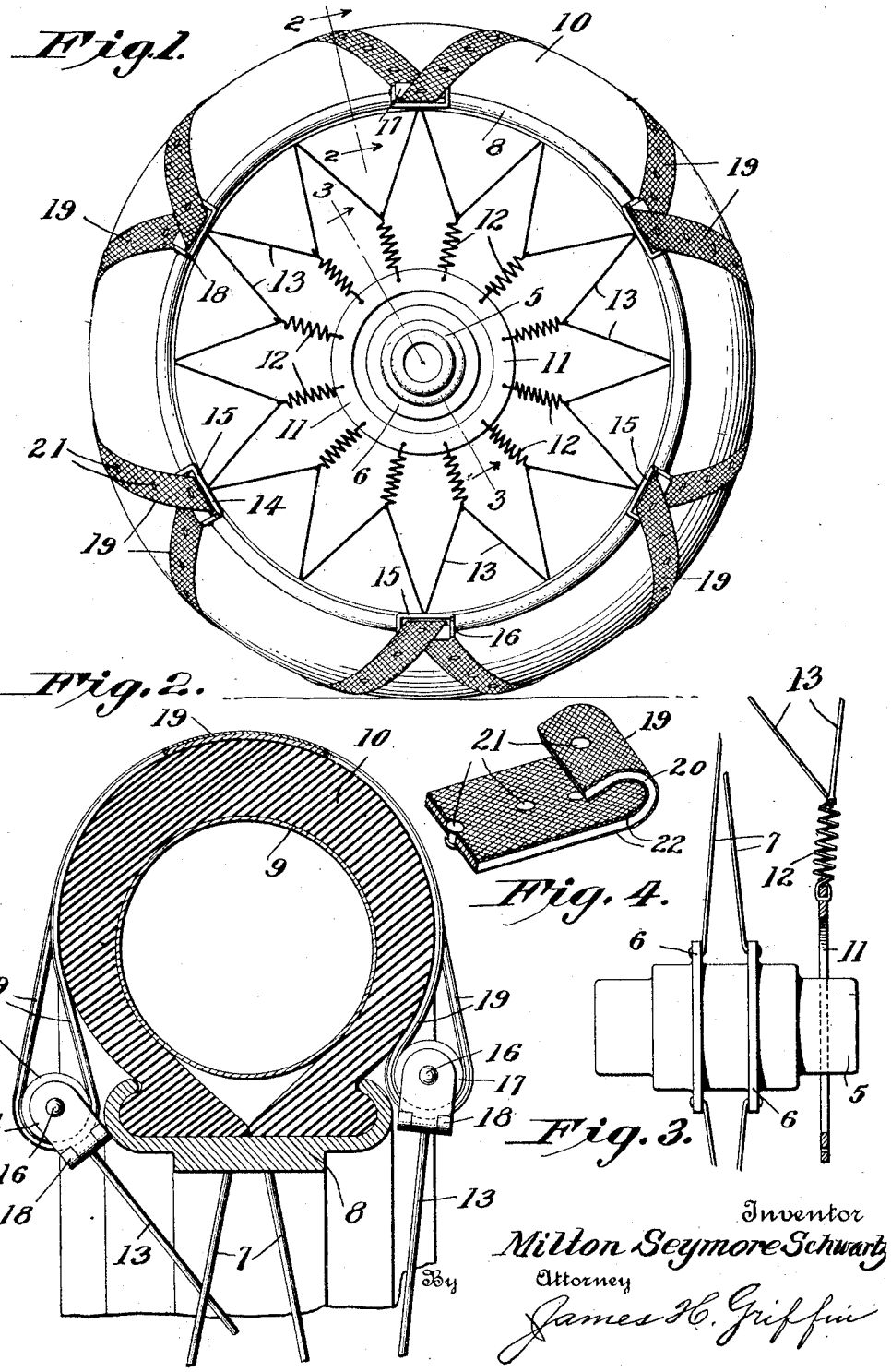

MILTON SEYMORE SCHWARTZ, OF BROOKLYN, NEW YORK.

ANTISKID ATTACHMENT FOR WHEELS.

1,332,362.  Specification of Letters Patent.  Patented Mar. 2, 1920.

Application filed April 26, 1918.  Serial No. 230,973.

*To all whom it may concern:*

Be it known that I, MILTON SEYMORE SCHWARTZ, a citizen of the United States, residing in the city of New York, borough of Brooklyn, county of Kings, and State of New York, have invented certain new and useful Antiskid Attachments for Wheels, of which the following is a specification.

This invention is an anti-skid attachment adapted, more particularly, for use on pneumatic and similar tires as a substitute for the chains now so extensively used.

Speaking generally, the invention, in its preferred form, embodies a continuous band of suitable material, laced around the shoe alternately from side to side, being threaded through guiding devices positioned near the rim of the wheel, said guiding devices being connected, preferably by resilient connections, to a common member concentric with the hub. More specifically, the invention embodies an annulus adapted to be slipped loosely over the hub of the wheel, said annulus forming a common attaching means for a plurality of outwardly and radially extending resilient members connected with anti-friction guiding devices positioned near the rim and on either side of the wheel, and through which the non-skidding member or fabric is alternately threaded from one side of the wheel to the other, thereby providing on the thread surface of the wheel a band of non-skidding material, which readily adapts itself to the various positions which it is called upon to assume.

The accompanying drawings illustrate the preferred, practical embodiment of the invention, but it is understood that this construction is typical only, and not exclusive of the different forms in which the generic invention may be embodied.

Referring to the drawings, Figure 1 is a side elevation of a wheel provided with a pneumatic tire having the non-skidding device secured thereto;

Fig. 2 is an enlarged sectional detail, taken on line 2—2 of Fig. 1;

Fig. 3 is an enlarged sectional detail, taken on line 3—3 of Fig. 1; and

Fig. 4 is a perspective view of a portion of the anti-skid band.

In the drawings, which illustrate the attachment applied to a wire wheel, 5 indicates the hub and 6 the collars to which the wire spokes 7 are secured. In the interest of clearness, the spokes have been omitted from Fig. 1. The customary rim is designated 8, the inner tube 9 and the shoe 10.

Concentric with the hub is an annular disk or plate 11, near the periphery of which are attached, in spaced relation, the inner ends of coiled springs 12. To the other ends of coiled springs 12 are attached wires 13, each pair of adjacent wires extending outwardly substantially in V form, and on the apex of which are secured, near both sides of the rim of the wheel, the guides 14. Each of these guides embodies a substantially U-shaped frame 15 in the sides of which is journaled the pintle 16 of the anti-friction roller 17. One side of the frame 15 is hinged, as shown at 18, or may embody any other suitable construction which will permit of the mounting of the roller 17 therein.

The anti-skidding band is designated 19, and, as clearly appears from Figs. 1 and 2, it extends around the shoe alternately from side to side, being successively threaded through the guides 14 on both sides of the rim, whereby it is forced to partake of a substantially zig-zag position on the tread surface of the shoe.

The preferred form of the band, see Fig. 4, embodies an intermediate layer of fabric 20, on each side of which is secured, by rivets 21, a wire mesh fabric 22, thereby providing a flexible band, yet one which possesses the necessary friction characteristics to especially adapt it for anti-skid purposes. The ends of the band may be secured together in any well-known manner, as by the employment of wire lacing.

As appears from the foregoing description, the invention is simple in construction, economical to manufacture, readily applied to the tire, and, owing to the relatively large anti-skid surface which it presents to the road-bed, coupled with the resilient and yielding characteristics, render the attachment particularly efficient for its intended purposes.

It will be understood that slight changes may be made in the specific structure described, such as the omission of non-essential elements or the substitution of equivalents, without departing from the spirit or substance of the invention, the scope of which is commensurate with the appended claims.

Having thus fully described my invention, what I claim as new, and desire to secure by Letters Patent, is:

1. In an anti-skid attachment for wheels, a plurality of guides positioned in spaced relation on either side of the wheel and in proximity to the rim, anti-friction devices mounted on said guides, means for retaining the guides in position, and a continuous band extending through said guides, alternately from side to side of the wheel, whereby the band partakes of a zig-zag path on the tread surface of the shoe.

2. In an anti-skid attachment for wheels, a plurality of guides positioned in spaced relation on either side of the wheel and in proximity to, but separate from, the rim, anti-friction devices mounted on said guides, resilient means for, coöperating with each of said guides and the hub for retaining the guides in position, and a continuous band extending through said guides, alternately from side to side of the wheel, whereby the band partakes of a zig-zag path on the tread surface of the shoe.

3. In an anti-skid attachment for wheels, a single floating supporting member normally concentric with the hub, and positioned at one side of the wheel, a plurality of guides spaced circumferentially of the wheel adjacent the rim thereof and disposed alternately on opposite sides of the wheel, a continuous band of anti-skid material threaded through the consecutive guides to overlie the shoe of the wheel in a zig-zag path, said guides being detached and independent of the rim, and connections, embodying a resilient element, between each of said guides and the floating supporting member for maintaining the guides in position and holding the band tightly to the shoe, whereby a single floating supporting member positioned at one side of the wheel serves to yieldably hold all of the guides, as well as the band, in operative position.

4. In an anti-skid attachment, a floating supporting member concentric with the hub, a plurality of outwardly and radially extending springs, one end of each of which is attached to said supporting member, a plurality of guides on either side of the wheel, each of said guides being provided with anti-friction rollers, connections between the springs and said guides, whereby the latter are yieldingly connected to the supporting member, and a continuous band of anti-skid material threaded through said guides so as to engage the rollers thereof alternately from side to side of the wheel, whereby the band partakes of a circuitous path on the outer surface of the shoe.

In testimony whereof, I have signed my name to this specification.

MILTON SEYMORE SCHWARTZ.